UNITED STATES PATENT OFFICE.

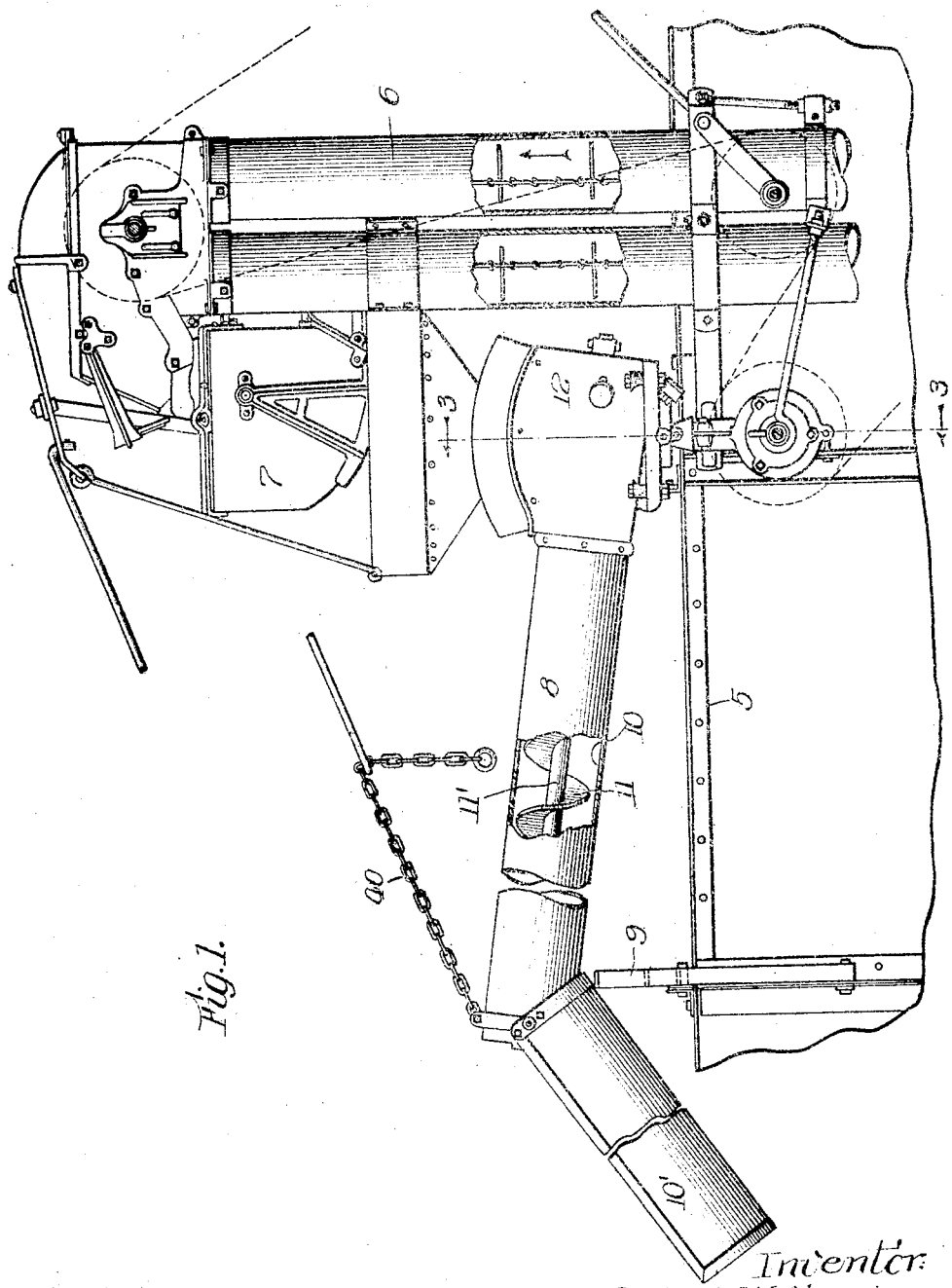

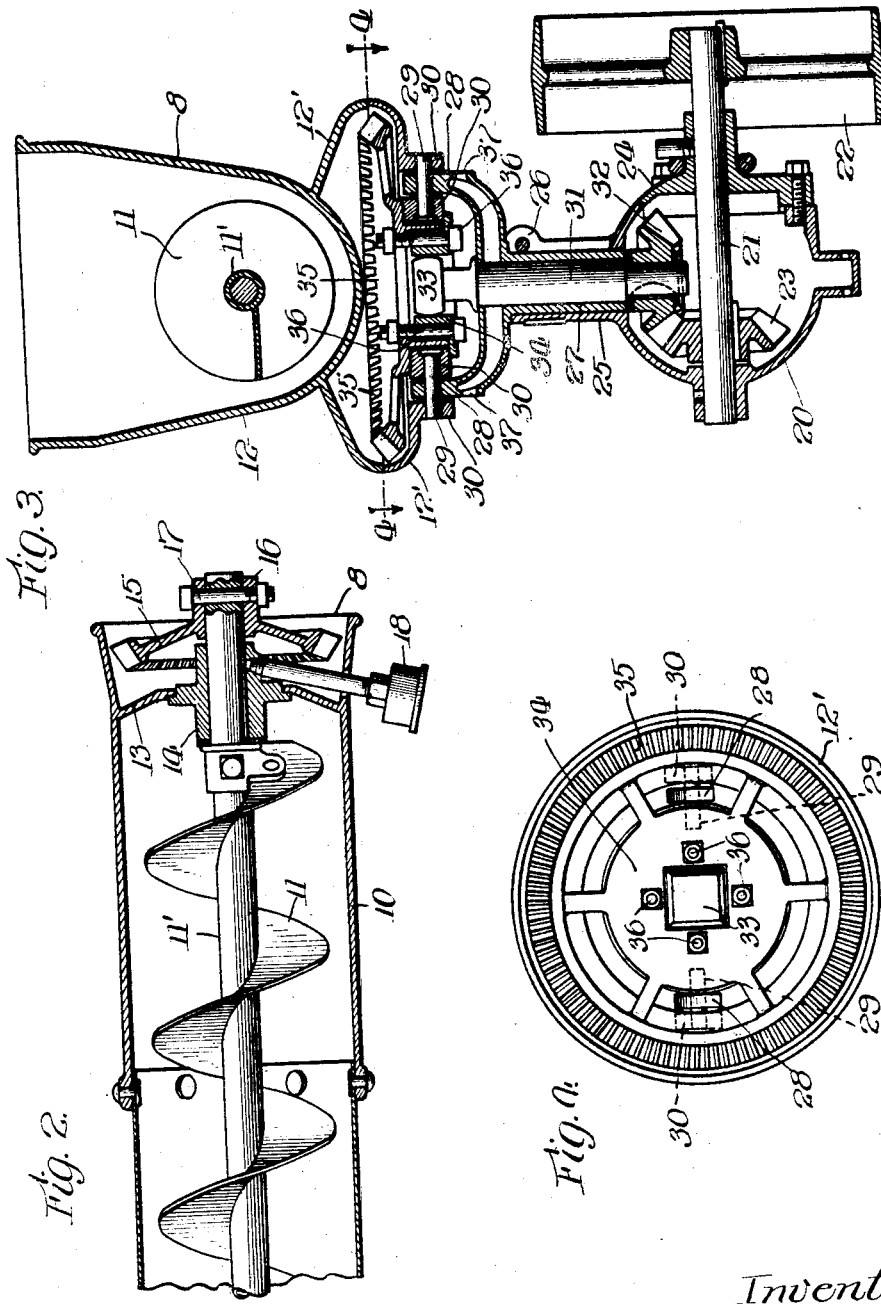

PATRICK W. MORRISSEY, OF RACINE, WISCONSIN, ASSIGNOR TO J. I. CASE THRESHING MACHINE COMPANY, OF RACINE, WISCONSIN, A CORPORATION.

CONVEYER.

1,381,328.   Specification of Letters Patent.   Patented June 14, 1921.

Application filed July 19, 1919. Serial No. 311,994.

*To all whom it may concern:*

Be it known that I, PATRICK W. MORRISSEY, a citizen of the United States, residing at Racine, in the county of Racine and State of Wisconsin, have invented certain new and useful Improvements in Conveyers, of which the following is a specification.

My invention relates to improvements in conveyers, more particularly designed for use in connection with threshing machines and the like, my object being to provide what is known as a cross conveyer so arranged as to permit of its universal adjustment, that is, in either vertical or horizontal directions, in order that it may be manipulated to discharge material from different elevations and at either side of the threshing machine, and whereby it can be readily positioned to load into sacks or wagons according to requirements.

In the accompanying drawings, forming part hereof, Figure 1 is a side elevation showing a threshing machine in fragment, having a grain elevator and weigher mounted thereon as is common, and also my improved cross conveyer; Fig. 2, a longitudinal sectional view of the conveyer; Fig. 3, a transverse vertical sectional view through the receiving end of the conveyer and its connecting mechanisms, taken on the dotted line 3—3 in Fig. 1, and Fig. 4, is a detail sectional view taken on the dotted line 4—4 in Fig. 3.

In said drawings, the portion marked 5 indicates the threshing machine, 6, the grain elevator, and, 7, the automatic grain weigher. My improved conveyer, 8, may be used with or without a weigher as will be understood, and is shown as positioned longitudinally of the thresher, and about to be lowered into resting position on a supporting member 9. Said conveyer comprises the usual casing, 10, in which is secured an auger, 11, and has at its receiving end an enlargement or hopper, 12, into which grain from the weigher 7 or otherwise is discharged, while at its delivery end it is preferably provided with an adjustable chute, 10'. Near the end of said casing I provide a wall, 13, Fig. 2, which supports a bearing, 14, for the shaft, 11', of auger 11, and upon which shaft is fixedly mounted a gear wheel, 15, having its hub, 16, secured to the end of said shaft by a bolt, 17, or otherwise. Said bearing 14 may be lubricated by an oiler, as 18, or in any other suitable manner.

Beneath the receiving end 12 of said conveyer I secure to the thresher supporting mechanisms for the conveyer, which also serve to actuate the auger 11 for conveying grain through said conveyer. I provide a housing, 20, in which is mounted a shaft, 21, having a pulley, 22, which is driven from the grain elevator 6 or otherwise, said shaft being provided with a gear-wheel, 23. Said housing 20 is provided with a door, 24, through which access may be had when desired, and which housing continues in a vertical direction to form a sleeve, 25, which is split longitudinally at one side and provided with apertured ears, 26, so that the same can be drawn together by a bolt to any extent desired, as will be fully explained. Within said housing sleeve 25 I mount a yoke, 27, the two forks, 28, of which by the pins, 29, pivotally connect auger casing 12 through its housing, 12', to said fork members, which connection permits conveyer 8 to be swung vertically on said yoke. In order to insure a substantial pivotal connection between said parts, I prefer to provide said housing 12' with double bearings, 30, for each fork member into which pins 29 are projected, so that said bearing, the yoke 28, and conveyer housing 12' are efficiently connected for the purpose. In said yoke member 27 I mount a vertical shaft, 31, having a gear-wheel, 32, at its lower end which meshes with wheel 23 on shaft 21, the upper end of said shaft 31 being provided with a substantially square head, 33, which fits loosely into a square opening in a head-plate, 34, these elements forming in effect a universal joint which permits adjustment of the conveyer in different directions. To said head-plate 34 I connect a gear-wheel, 35, by suitable bolts, 36, or otherwise, which gear-wheel is inclosed within the housing 12' and meshes with and drives the vertically arranged gear-wheel 15 mounted on auger shaft 11'. The fork members 28 are of hollow formation and provided with inlets, 37, near their ends to receive a lubricant designed to flow between the lower yoke extension 27 and the shaft 31. As said yoke rotates about shaft 31, when the conveyer is swung horizontally its degree of frictional movement may be controlled by the adjustable ears 26.

In operation, shaft 31 is rotated through shaft 21, the square head 33 of said shaft 31 revolving plate 34 which in turn revolves gear-wheel 35 connected thereto, and said wheel 35 meshing with gear 15 (Fig. 2) rotates the same to actuate the auger 11. While thus in operation said auger casing may be raised or lowered as desired, and held in position by the chain support, 40, or otherwise, such vertical adjustment not interfering with the rotation of said auger 11 for the reason that head 33 constantly rotates gear-wheel 35 regardless of its angle of inclination. Also while in operation, the conveyer may be swung away from or across the threshing machine, such swinging movement being permitted by the yoke extension or sleeve 27 which is revolubly mounted upon shaft 31. By this simple arrangement it will be understood that the conveyer with its auger in rotary motion may be swung either vertically or horizontally as desired to meet the many conditions in loading grain from threshing machnes, the form of the universal joint permitting free movement of the conveyer at all times whether inactive or in rotary motion, said conveyer being thus adjustable by manually swinging the same in the required direction.

I claim as my invention:

1. In a conveyer, a vertical shaft having a head thereon, a plate within which said head is loosely fitted, said head and plate forming a universal joint, a gear-wheel connected to said plate, and means for rotating said shaft to actuate said gear-wheel.

2. In a conveyer, an auger having a gear at its end, a gear-wheel meshing with and actuating said auger gear, a rotatable plate connected to said last mentioned gear-wheel, a shaft having a head at its upper end loosely mounted in said plate, said head and plate constituting a universal joint, and means for rotating said shaft and gear-wheels for actuating said auger.

3. In a conveyer, a driving shaft, a driven shaft communicating therewith and having a head at its upper end, a yoke mounted upon said driven shaft, a gear-wheel pivotally mounted upon said yoke, a plate connected to said gear-wheel in which said driven shaft head is loosely mounted, said plate and head constituting a universal joint, and an auger embodying a gear communicating with and driven by said wheel.

4. In a conveyer, a housing having an upwardly extending adjustable member, a yoke embodying a sleeve seated in said adjustable member, a shaft mounted in said sleeve and having an enlarged head, a gear-wheel pivotally mounted upon said yoke, a plate secured to said gear-wheel in which said head is mounted, means for actuating said shaft and rotating said gear-wheel, and an auger embodying a gear communicating with and actuated by said gear-wheel.

5. In a conveyer, a shaft having a head at its upper end, means for rotating the same, a sleeved yoke mounted over said shaft and having lubricating channels therein, a gear-wheel pivotally mounted upon said yoke, a plate secured to said gear-wheel in which said shaft head is loosely mounted, and an auger embodying a gear communicating with and actuated by said gear-wheel.

In testimony whereof I affix my signature.

PATRICK W. MORRISSEY.